(12) United States Patent
Rambaldi et al.

(10) Patent No.: US 6,292,173 B1
(45) Date of Patent: Sep. 18, 2001

(54) TOUCHPAD COMPUTER INPUT SYSTEM AND METHOD

(75) Inventors: Roberto Rambaldi, Bologna; Marco Tartagni, Meldola; Zsolt Miklos Kovaks-Vajna; Nicolo' Manaresi, both of Bologna, all of (IT)

(73) Assignee: STMicroelectronics S.r.l. (IT)

( * ) Notice: Subject to any disclaimer, the term of this patent is extended or adjusted under 35 U.S.C. 154(b) by 0 days.

(21) Appl. No.: 09/151,558

(22) Filed: Sep. 11, 1998

(51) Int. Cl.[7] ........................................ G09G 5/08
(52) U.S. Cl. .................. 345/157; 345/173; 382/288
(58) Field of Search ........................... 345/157, 173, 345/163; 382/288, 107, 294, 130

(56) References Cited

U.S. PATENT DOCUMENTS

| | | | | |
|---|---|---|---|---|
| 4,353,056 | * | 10/1982 | Tsikos | 382/124 |
| 5,115,475 | * | 5/1992 | Lebeau | 382/146 |
| 5,168,531 | * | 12/1992 | Sigel | 382/291 |
| 5,239,292 | * | 8/1993 | Willan | 345/135 |
| 5,325,442 | * | 6/1994 | Knapp | 382/124 |
| 5,463,388 | * | 10/1995 | Boie et al. | 341/33 |
| 5,483,261 | * | 1/1996 | Yasutake | 345/173 |
| 5,483,601 | * | 1/1996 | Faulkner | 382/115 |
| 5,488,204 | * | 1/1996 | Mead et al. | 345/179 |
| 5,543,588 | * | 8/1996 | Bisset et al. | 178/18 |
| 5,543,591 | * | 8/1996 | Gillespie et al. | 178/18 |
| 5,687,333 | * | 11/1997 | Dobashi et al. | 345/336 |
| 5,799,098 | * | 8/1998 | Ort et al. | 382/125 |
| 5,825,352 | * | 10/1998 | Bisset et al. | 345/173 |
| 5,943,043 | * | 8/1999 | Furuhata et al. | 345/173 |
| 5,963,679 | * | 10/1999 | Setlak | 382/312 |
| 6,037,882 | * | 3/2000 | Levy | 341/20 |

* cited by examiner

*Primary Examiner*—Bipin Shalwala
*Assistant Examiner*—Ricardo Osorio
(74) *Attorney, Agent, or Firm*—Thompson & Knight L.L.P.

(57) ABSTRACT

A method of and system for providing user input to a computer captures a first finger position image at a first time and a second finger position image at a second time. The first and second finger position images each comprise a plurality of numerical gray scale values equal to or greater than zero. The system then subtracts the first finger position image from the second finger position image to obtain a composite image. The composite image has a first region comprising numerical values less than zero and a second region comprising numerical values greater than zero. The system provides X-Y input to the computer based upon the relative positions of first and second regions. The system further provides Z input to the computer based upon the relative sizes of said first and second regions.

20 Claims, 2 Drawing Sheets

TOUCHPAD COMPUTER INPUT SYSTEM AND METHOD

CROSS-REFERENCE TO RELATED APPLICATIONS

The present application is related to U.S. application Ser. No. 09/012,065, filed Jan. 22, 1998, by A. Ferrari and M. Tartagni, entitled TOUCHPAD PROVIDING SCREEN CURSOR/POINTER MOVEMENT CONTROL, which is incorporated herein by reference. The present application is also related to U.S. application Ser. No. 08/799,548, filed Feb. 13, 1997, by M. Tartagni, entitled CAPACITIVE DISTANCE SENSOR, which is incorporated by reference.

FIELD OF THE INVENTION

The present invention relates generally to methods of and systems for providing user input to user interfaces for computers and the like, and more particularly to a semiconductor touchpad user input device and method for controlling the X-Y position of a cursor or pointer on a display and for providing Z input to a computer.

DESCRIPTION OF THE PRIOR ART

Pointing devices are commonly used in conjunction with computers to control the movement of graphical cursers or pointers on display screens and to select objects and operate controls displayed on the screen. For desktop computers and work stations, the most commonly used pointing device is a mouse. As is well known, a mouse is moved over a flat surface to control the position of the pointer on the display screen. The mouse includes one or more buttons that may be pressed or clicked to perform operations on objects and controls displayed on the screen.

Recently, small laptop and notebook computers have become very popular. Laptop and notebook computers may be used in conjunction with a docking station so that a standard keyboard, mouse, and CRT display may be used for the user interface. However, laptop and notebook computers are designed to be used while traveling away from the office or home. In such remote locations, the user does not always have available a flat surface upon which to use a mouse. Accordingly, laptop and notebook computers typically have a built-in pointing device, such as a track ball, touchpad, or a pressure-actuated pointer device, such as the IBM TrackPoint(TM) device.

In addition to computers, certain television and set top box systems include a graphically user interface for enabling a user to input information to the system and change or control system settings. The user input device for such systems is typically a hand-held infrared keypad controller. Such controllers may include devices similar to those used in laptop and notebook computers to control the position of a pointer on the television screen. Trackballs, touchpads, and pressure-actuated pointing devices have certain drawbacks. For example, while trackballs are compact, they require consider finger movement to produce large pointer displacements at low velocities. In addition, trackballs are mechanical devices that may not be well suited for operation in dirty environments.

A touchpad comprises a rectangular surface that is mapped to correspond to a display screen. By touching the location on the touchpad, the user causes the computer to move the pointer to the corresponding location on the screen. Since a typical touchpad is substantially smaller than the screen, accurate positioning of the pointer can be difficult. In order to be useable, a touchpad must be large enough to permit the user to position the pointer accurately. The large size of touchpads makes them relatively expensive.

Pressure-actuated pointing devices include strain gauges or transducers that detect the direction and magnitude of the force of the user's finger on the device. The pointer is moved in a direction corresponding to the direction of the force and to the speed corresponding to the magnitude of the force. Certain individuals have trouble using pressure-actuated pointing devices to position the pointer accurately on the screen. One source of trouble is inertia, whereby the pointer continues to move after the user releases the pressure on the device.

In U.S. application Ser. No. 09/012,065, filed Jan. 22, 1998, by A. Ferrari and M. Tartagni, entitled "Touchpad Providing Screen Cursor/Pointer Movement Control", there is disclosed a touchpad device that includes a matrix array of capacitance sensors. The array of the invention can be used initially to acquire a user fingerprint for use in a user identification procedure that occurs during logon to a device such as a laptop or palmtop computer. Subsequently, the array is used to provide user input to the computer. By using the array both for user identification and for user input, the cost of the relatively large array is justified.

It is an object of the present invention to provide an improved capacitance touchpad user input device.

SUMMARY OF THE INVENTION

Briefly stated, the present invention provides method of and system for providing user input to a computer. The system of the present invention captures a first finger position image at a first time and a second finger position image at a second time. The first and second finger position images each comprise a plurality of numerical gray scale values equal to or greater than zero. The system then subtracts the first finger position image from the second finger position image to obtain a composite image. The composite image has a first region comprising numerical values less than zero and a second region comprising numerical values greater than zero. The system provides X-Y input to the computer based upon the relative positions of first and second regions. The system further provides Z input to the computer based upon the relative sizes of said first and second regions.

The system of the present invention provides X-Y input by computing a centroid for each of the first and second regions. Then the system subtracts the centroid for the first region from the centroid for the second region to obtain a displacement vector. The system moves a pointer in the X-Y plane according to said displacement vector.

The system of the present invention provides Z input to the computer by comparing the area of the first region to the area of the second region. If the area of the first region is less than the area of the second region, the system inputs a positive Z input. If the area of the first region is greater than the area of the second region, the system inputs a negative Z input. Preferably, a positive Z input is interpreted as a mouse button down input and a negative Z input is interpreted as a mouse button up input.

DESCRIPTION OF THE PREFERRED EMBODIMENT

Figure 1:
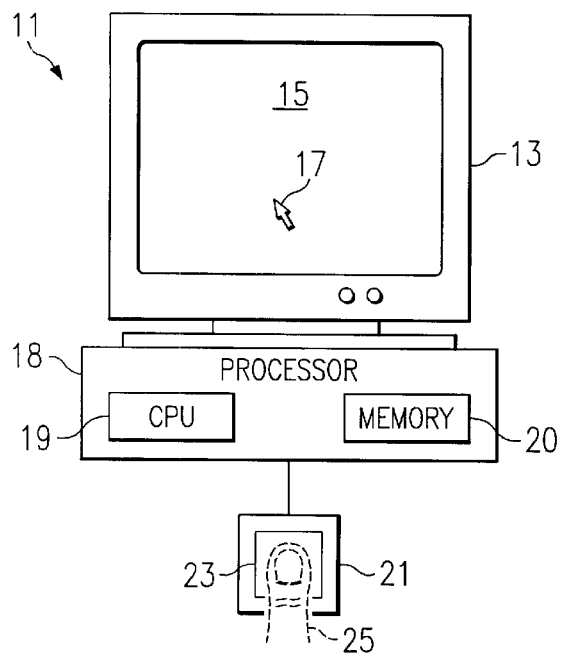
FIG. 1 is a block diagram of a system according to the present invention.

Referring now to the drawings, and first to FIG. 1, a system according to the present invention is designated generally by the numeral 11. System 11 includes a display 13 which includes a screen 15. A pointer 17 is shown displayed on screen 15. Display 13 may be, for example, a standard CRT computer monitor. Alternatively, screen 13 may operate on any of several non-CRT technologies used in laptop and notebook computers. System 11 also includes a processor 18 that includes a central processing unit (CPU) 19 and memory 20. Preferably, CPU 19 is a microprocessor such as an Intel 166 MHz Pentium Microprocessor. Memory 20 includes random access memory (RAM).

System 11 includes a user input device 21. In FIG. 1, user input device 21 is represented generally as a rectangle. The specific form of user input device 21 is determined by the configuration of the system. For example, the user input device may be integrated into the body of a laptop or notebook computer, or it may be part of a hand-held infrared remote control device.

User input device 21 includes a sensing element 23. As will be described in detail hereinafter, sensing element 23 senses movement of the user's thumb or finger, shown in phantom and designated by the numeral 25, to control the X-Y position of pointer 17 on screen 15. As will further be described in detail hereinafter, sensing element 23 also senses the placing or lifting of a finger on sensing element 23 or changes in finger pressure on sensing element 23 to provide Z input to microprocessor 19. Z input may be interpreted as mouse button up and mouse button down signals. Also, Z input may be interpreted as driving pointer 17 into a three dimensional graphical user interface displayed on screen 15.

Figure 2:
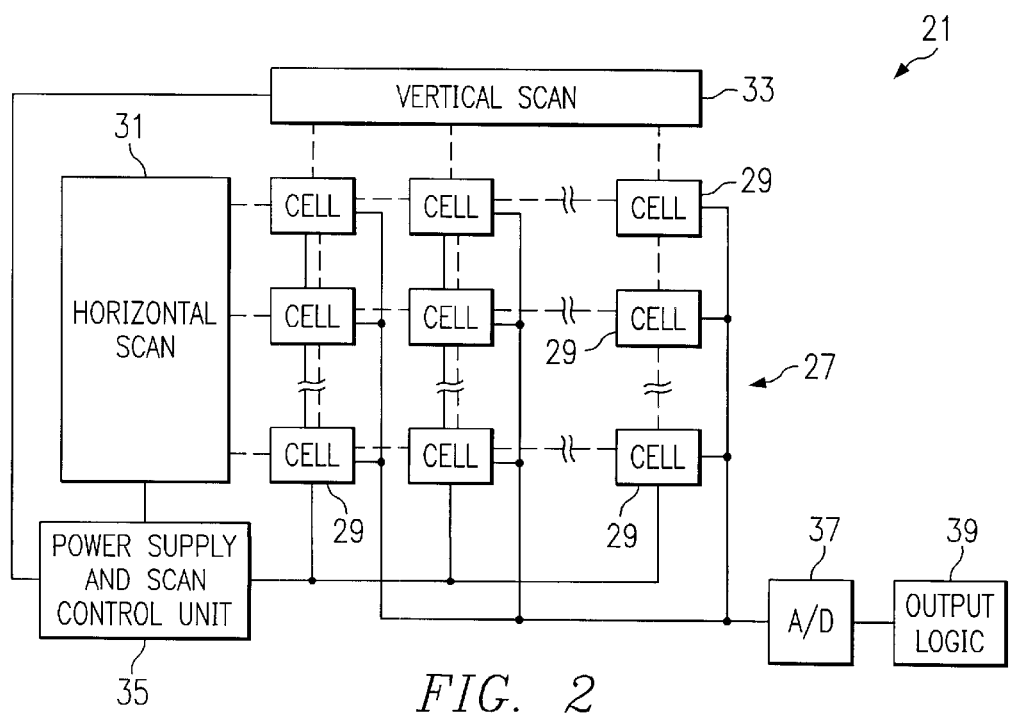
FIG. 2 is a block diagram of a sensor array according to the present invention.

Referring now to FIG. 2, there is shown a block diagram of user input device 21. User input device 21 is preferably integrated into a single chip, and it includes an array 27 of cells 29. Array 27 comprises M rows and N columns. The number of rows M and columns N may or may not be the same. Preferably, each cell 29 is smaller than the width of a fingerprint ridge, and in the preferred embodiment, cells 29 are on a pitch of 50 micrometers, which corresponds to a resolution of about 508 dots per inch. Device 21 includes a horizontal scanning stage 31 and a vertical scanning stage 33. Scanning stages 31 and 33 enable one cell 29 at a time according to a predetermined scanning pattern.

Input device 21 includes a power supply and scan control unit 35. Power supply and scan control unit 35 supplies a reference voltage to each cell 29 of array 27. Power supply and scan control unit 35 also operates scanning stages 31 and 33 to produce the desired scanning of cells 29. An A/D converter 37 is connected to receive the output of each cell 29 of array 27. The output of each cell 29 is a voltage that represents a gray scale value for the pixel defined by the cell. A/D converter 37 converts the voltage into an eight bit numerical gray scale value. The output of A/D converter 37 is connected to output logic 39, which processes the output of A/D converter 37 to capture successive images. The successive images comprise arrays of pixels with each pixel having a gray scale value from zero to 255. As will be explained in detail hereinafter, the successive images are processed, preferably in microprocessor 19, to provide X-Y, and Z inputs to microprocessor 19.

Figure 3:
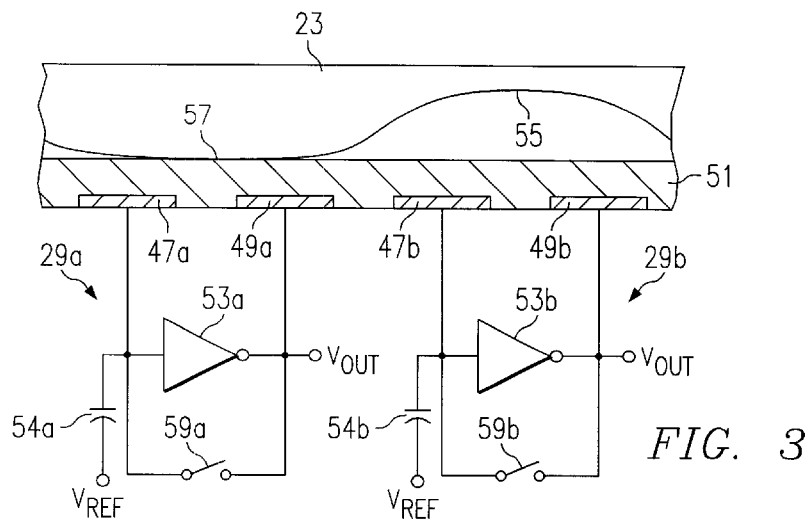
FIG. 3 illustrates the physical structure of the individual sensor cells and their electrical operation according to the present invention.

Referring now to FIG. 3, there is illustrated the structure and operation of a cell 29 according to the present invention. The preferred cell of the present invention is of the type disclosed in Tartagni, U.S. patent application Ser. No. 08/799,543, filed Feb. 13, 1997, entitled "Capacitive Distance Sensor," the disclosure of which is incorporated herein by reference. Each cell 29 includes a first capacitor plate 47 and a second capacitor plate 49 supported on a semiconductor substrate, which is preferably a conventional silicon substrate that may have a conventional shallow epitaxial layer defining an upper surface region thereof. The top surface of the substrate includes an insulating layer 41. Insulating layer 41 is preferably an oxide layer, which may be a conventional thermally grown silicon dioxide layer. Conductor plates 47 and 49 are covered by a protective coating 51 of a hard material. Protective coating 51 protects sensor 29 from abrasion, contamination, and electrostatic discharge.

Each cell 29 includes a high gain inverting amplifier 53. The input of inverter 53 is connected to a reference voltage source $V_{REF}$ through an input capacitor 54. The output of inverter 53 is connected to an output $V_{OUT}$. The input of inverter 53 is connected to conductor plate 47 and the output of inverter 53 is connected to conductor plate 49, thereby creating a charge integrator whose feedback capacitance is the effective capacitance between conductor plates 47 and 49.

When a finger 23 is placed on the surface of protective layer 51, the upper surface of the skin over each sensor acts as a third capacitor plate separated from adjacent conductor plates 47 and 49 by a dielectric layer that includes protective coating 51 and a variable thickness of air. Because fingerprint valleys 55 will be farther from conductor plates 47 and 49 than finger ridges 57, sensors beneath valleys will have more distance between their capacitor plates 47 and 49 and the skin surface than sensors under ridges 57. The thickness of this dielectric layer will modulate the capacitance coupling between plates 47 and 49 of each cell 29. Accordingly, sensors 29 under valleys will exhibit a different effective capacitance than sensors 29 under ridges. As shown in FIG. 3, the effective capacitance of sensor 29a is different from the effective capacitance of sensor 29b.

Sensors 29 work in two phases. During the first phase, the charge integrator is reset with a switch 59 by shorting the input and output of inverter 53. This causes inverter 53 to settle to its logical threshold. During the second phase, a fixed charge is input to the charge integrator, causing an output voltage swing inversely proportional to the feedback capacitance, which is the effective capacitance between conductor plates 47 and 49. For a fixed amount of input charge, the output of inverter 53 will range between two extremes depending on the effective feedback capacitance value. The first extreme is a saturated voltage level if the effective feedback capacitance is very small. The second extreme is a voltage close to the logical threshold, which is the reset value, when the effective feedback capacitance is large. Since the distance between the skin and the sensor changes the effective feedback capacitance of the charge integrator, the output of sensor 29A under ridge 57 will be different from the output of sensor 29B under valley 55.

Figure 4A:
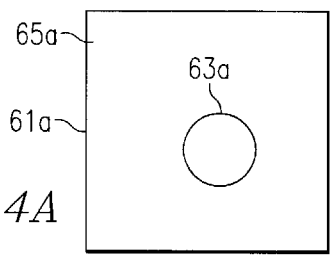
FIGS. 4A–4C comprise a pictorial illustration of the operation of a system according to the present invention to provide X-Y input to a computer.
Figure 4B:
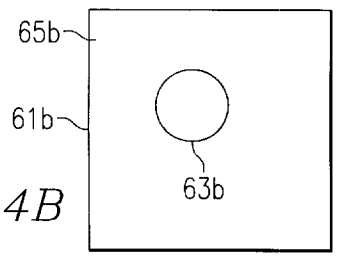
Figure 4C:
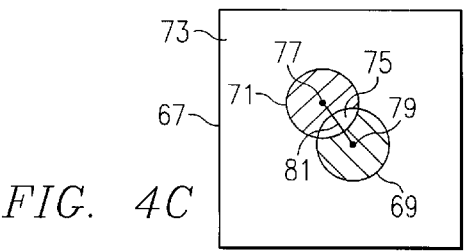

The operation of the system of the present invention to control the X-Y position of pointer 17 on screen 15 is illustrated with respect to FIGS. 4A–4C. In FIG. 4A, an image 61a is captured by sensing element 23 at an initial time $T_0$. Image 61a includes a portion 63a, which is an image of a portion of a user's fingertip. The pixels of portion 63a have numerical gray scale values greater than zero. The remainder 65a of image 61a comprises a plurality of pixels having numerical gray scale values substantially equal to zero. Preferably, image 61a is stored at a first memory location in microprocessor 19.

In FIG. 4B, there is shown an image 61b, which is captured at a second time $T_1$. Image 61b includes a portion 63b, which is the image of the user's fingertip at time $T_1$. Again, image 63b comprises a plurality of pixels having positive gray scale values. The remainder of 65b of image 61b again comprises a plurality of pixels having a gray scale values substantially equal to zero. Preferably, image 61b is stored at a second memory location in microprocessor 19.

According to the present invention, X-Y input is based upon the displacement of portion 63b of FIG. 4B with respect to portion 63a of FIG. 4A. To calculate the displacement, image 61a is subtracted from image 61b to form a composite image 67 illustrated in FIG. 4C. Since the pixels of images 61a and 61b have gray scale values equal to or greater than zero, preferably ranging from zero to 255, subtracting image 61a from image 61b results in a composite image having gray scale values ranging from –255 to +255. By defining a region around zero having a width of +/–40 gray units, three regions can be identified, i.e. those with positive values greater than 40, those with negative values less than –40, and those around zero. Accordingly, composite image 67 includes a negative region 69 and a positive region 71. Composite image 67 also has regions 73 and 75 which have substantially zero gray scale values. The range around zero is used to filter out the background pixels. The difference computation with the range around zero is also used to overcome the "fixed pattern noise" problem, which is connected to oxide variation, and the presence of humidity or faulty cells.

The magnitude and direction of the finger position displacement is determined by computing the centroid 77 of positive region 71 and the centroid 79 of negative region 69 of composite image 67. The respective centroids $(b_x, b_y)$ of the respective positive region 71 and negative region 69 are computed according to the center of mass formula $$b_x = \frac{1}{n}\sum_i x_i$$

$$b_y = \frac{1}{n}\sum_i y_i$$

where n is the area of or number of pixels in the region and the index i extends only to the region considered.

The displacement of centroid 77 with respect to centroid 79 is indicated by a displacement vector 81. Displacement vector 81 is the difference between the coordinates of centroids 77 and 79. The displacement vector, or a velocity vector obtained by dividing the displacement vector by the time between $T_0$ and $T_1$, is input to pointer control software in microprocessor 19, thereby to control the position of pointer 17 on screen 15.

Figure 5A:
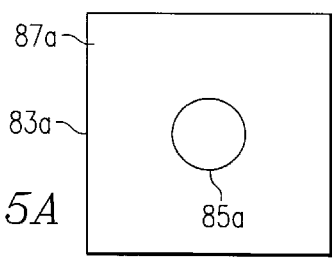
FIGS. 5A–5C comprise a pictorial illustration of the operation of a system according to the present invention to provide Z input to a computer.
Figure 5B:
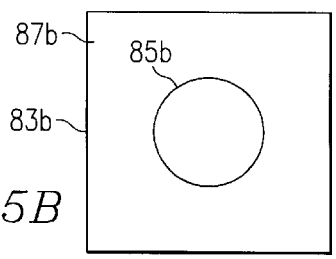
Figure 5C:
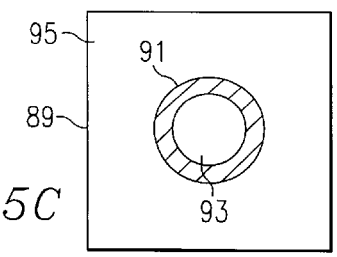

Referring now to FIGS. 5A–5C, there is illustrated the operation of the present invention in processing Z input. In FIG. 5A, an image 83a is captured at a first time $T_0$. Image 83a includes a portion 85a which comprises a plurality of pixels having positive gray scale values. The remaining portion 87a of image 83a comprises pixels having gray scale values substantially equal to zero. In FIG. 5B there is shown an image 83b captured at a second time $T_1$. Image 83b includes a portion 85b and a remaining portion 87b. It will be observed that portion 85b of image 83b is larger than portion 85a of image 83a, which indicates that the user has increased fingertip pressure on sensor 23. According to the present invention, image 83a is stored at a first memory location and image 83a is stored at a second memory location. Image 83a is then subtracted from image 83b to form a composite image 89, which is illustrated in FIG. 5C. Composite image 89 includes a region 91, which comprises pixels having positive gray scale values. Composite image 89 also includes regions 93 and 95, each comprising pixels having gray scale values substantially equal to zero. In FIGS. 5A and 5B, there has been substantially no X-Y movement of the user's fingertip. Accordingly, there is no negative region in composite image 89.

The present invention computes Z displacement by comparing the areas of the positive and negative regions of composite image 89. If the positive region is larger than the negative region, as shown in FIG. 5C in which there is no negative region, then a positive Z displacement is indicated. Alternatively, if the negative region in the composite image is larger than the positive region, then a negative Z displacement is indicated. It will be noted with respect to FIG. 4C, that positive region 71 and negative region 69 are of substantially the same area, which indicates no Z displacement.

In the preferred embodiment, Z displacement is computed according to the following formula:

$$\Delta Z = \frac{N_p - N_n}{N_p + N_n}$$

where $N_p$ is the number of positive pixels and $N_N$ is the number of negative pixels. Referring to FIG. 5C, since the number of negative pixels is zero, the Z displacement is +1. In the preferred embodiment, a positive Z displacement is interpreted as a mouse button down input and a negative Z displacement is interpreted as a mouse button up input.

After the system has computed the X-Y displacement vector and the Z value, the system moves the image captured at time $T_1$ into the first memory location, captures an image at a time $T_2$, and stores the captured image in the second memory location. The system repeats the steps of the method of the present invention to provide X-Y and Z input to the computer system.

From the foregoing, it may be seen that the present invention provides an efficient system and method for providing user input to a computer or the like. While the present invention has been illustrated and described with respect to a presently preferred embodiment, those skilled in the art, given the benefit of this disclosure, will recognize alternative embodiments. Additionally, certain features of the invention may be used independently of other features. For example, the X-Y input feature and the Z input feature may be implemented separately, all as would be apparent to one skilled in the art.

What is claimed is:

1. A method of providing user input to a computer, which comprises the computer implemented steps of:

capturing a first finger position image at a first time with an array of electric field sensors, said first finger position image being a first data array comprising a numerical value equal to or greater than zero for each sensor of said array of sensors;

capturing a second finger position image at a second time with said array of electric field sensors, said second finger position image being a second data array comprising a numerical value equal to or greater than zero for each sensor of said array of sensors;

subtracting said first finger position image from said second finger position image to obtain a composite image, said composite image having a first region comprising gray scale, numerical values less than zero and a second region comprising gray scale numerical values greater than zero; and providing input to said computer based upon said first and second regions.

2. The method as claimed in claim 1, further comprising the computer implemented step of:

moving a pointer according to displacement of said second region with respect to said first region.

3. The method as claimed in claim 2, further comprising the computer implemented step of: computing a displacement vector based upon said displacement.

4. The method as claimed in claim 3, wherein said step of computing a displacement vector includes the computer implemented steps of:

computing a centroid for said first region;

computing a centroid for said second region; and subtracting said centroid for said first region from said centroid for said second region to obtain said displacement vector.

5. The method as claimed in claim 1, further comprising the computer implemented steps of:

computing a centroid for said first region;

computing a centroid for said second region;

subtracting said centroid for said first region from said centroid for said second region to obtain a displacement vector; and moving a computer pointer according to said displacement vector.

6. The method as claimed in claim 1, further comprising the computer implemented step of:

inputting a mouse button signal to said computer based upon the respective areas of said first and second regions.

7. The method as claimed in claim 6, further comprising the computer implemented steps of:

comparing the area of said first region to the area of said second region;

interpreting user input as a mouse button down if the area of said first region is less than the area of said second region; and interpreting user input as a mouse button up if the area of said first region is greater than the area of said second region.

8. The method as claimed in claim 6, further comprising the computer implemented steps of:

(a) subtracting the area of said first region from the area of said second region;

(b) dividing the result of step (a) by the sum of the areas said first and second regions;

(c) interpreting user input as a mouse button down if the result of step (b) is greater than zero; and (d) interpreting user input as a mouse button up if the result of step (b) is less than zero.

9. The method as claimed in claim 1, wherein a finger is in contact with said array of sensors during said capturing a first finger position image and during said capturing second finger position.

10. A method of providing user input to a computer, which comprises the computer implemented steps of:

capturing a first finger position image at a first time, said first finger position image comprising a plurality of numerical values equal to or greater than zero;

capturing a second finger position image at a second time, said second finger position image comprising a plurality of numerical values equal to or greater than zero;

subtracting said first finger position image from said second finger position image to obtain a composite image, said composite image having a first region comprising numerical values less than zero and a second region comprising numerical values greater than zero; and providing input to said computer based upon said first and second regions, wherein said step of providing input to said computer includes the computer implemented step of inputting a mouse button signal to said computer based upon the respective areas of said first and second regions, wherein said step of inputting a mouse button signal includes the computer implemented steps of:

(a) subtracting the area of said first region from the area of said second region;

(b) dividing the result of step (a) by the sum of the areas of said first and second regions;

(c) interpreting user input as a mouse button down if the result of step (b) is greater than zero; and (d) interpreting user input as a mouse button up if the result of step (b) is less than zero.

11. A method of providing user input to a computer, which comprises the computer implemented steps of:

capturing a first finger position image at a first time with an array of electric field sensors, said first finger position image being a first data array comprising a numerical value equal to or greater than zero for each sensor of said array of sensors;

capturing a second finger position image at a second time with said array of electric field sensors, said second finger position image being a second data array comprising a numerical value equal to or greater than zero for each sensor of said array of sensors;

subtracting said first finger position image from said second finger position image to obtain a composite image, said composite image having a first region comprising gray scale numerical values less than zero and a second region comprising gray scale numerical values greater than zero;

providing X-Y input to said computer based upon the relative positions of first and second regions; and providing Z input to said computer based upon the relative sizes of said first and second regions.

12. The method as claimed in claim 11, further comprising the computer implemented step of:

moving a pointer according to displacement of said second region with respect to said first region.

13. The method as claimed in claim 12, further comprising the computer implemented step of:

computing a displacement vector based upon said displacement.

14. The method as claimed in claim 13, wherein said step of computing a displacement vector includes the computer implemented steps of:

computing a centroid for said first region;

computing a centroid for said second region; and subtracting said centroid for said first region from said centroid for said second region to obtain said displacement vector.

15. The method as claimed in claim 11, further comprising the computer implemented steps of:

computing a centroid for said first region;

computing a centroid for said second region;

subtracting said centroid for said first region from said centroid for said second region to obtain a displacement vector; and moving a computer pointer according to said displacement vector.

16. The method as claimed in claim 11, further comprising the computer implemented steps of:

comparing the area of said first region to the area of said second region;

inputting positive Z input if the area of said first region is less than the area of said second region; and, inputting negative Z input if the area of said first region is greater than the area of said second region.

17. The method as claimed in claim 11, further comprising the computer implemented steps of:

(a) subtracting the area of said first region from the area of said second region;

(b) dividing the result of step (a) by the sum of the areas said first and second regions;

(c) inputting positive Z input if the result of step (b) is greater than zero; and (d) inputting negative Z input if the result of step (b) is less than zero.

18. The method as claimed in claim 17, wherein said positive Z input is interpreted as a mouse button down input and said negative Z input is interpreted as a mouse button up input.

19. A method of providing user input to a computer, which comprises the computer implemented steps of:

capturing a first finger position image at a first time, said first finger position image comprising a plurality of numerical values equal to or greater than zero;

capturing a second finger position image at a second time, said second finger position image comprising a plurality of numerical values equal to or greater than zero;

subtracting said first finger position image from said second finger position image to obtain a composite image said composite image, having a first region comprising numerical values less than zero and a second region comprising numerical values greater than zero;

providing X-Y input to said computer based upon the relative positions of first and second regions; and providing Z input to said computer based upon the relative sizes of said first and second regions, wherein said step of providing Z input to said computer includes the computer implemented steps of:

(a) subtracting the area of said first region from the area of said second region;

(b) dividing the result of step (a) by the sum of the areas of said first and second regions;

(c) inputting positive Z input if the result of step (b) is greater than zero; and (d) inputting negative Z input if the result of step (b) is less than zero.

20. The method as claimed in claim 19, wherein said positive Z input is interpreted as a mouse button down input and said negative Z input is interpreted as a mouse button up input.

* * * * *